United States Patent [19]

Yamazaki et al.

[11] Patent Number: 4,940,270
[45] Date of Patent: Jul. 10, 1990

[54] AUTOMOBILE BUMPER

[75] Inventors: Masayuki Yamazaki; Yutaka Takado, both of Kanagawa; Takashi Mikami, Tokyo, all of Japan

[73] Assignee: Tonen Sekiyukagaku K.K., Tokyo, Japan

[21] Appl. No.: 316,038

[22] Filed: Feb. 27, 1989

Related U.S. Application Data

[63] Continuation of Ser. No. 159,580, Mar. 28, 1988, abandoned.

[30] Foreign Application Priority Data

Jun. 27, 1986 [JP] Japan ................. 61-152254

[51] Int. Cl.⁵ .......................................... B60R 19/02
[52] U.S. Cl. ................... 293/122; 293/110; 293/132
[58] Field of Search ............... 293/107, 120, 121, 122, 293/132, 136, 110, 109

[56] References Cited

U.S. PATENT DOCUMENTS

| | | | |
|---|---|---|---|
| 3,897,967 | 8/1975 | Barenyi | 293/120 |
| 3,938,841 | 2/1976 | Glance et al. | 293/120 |
| 4,613,177 | 9/1986 | Loren et al. | 293/109 |
| 4,652,032 | 3/1987 | Smith | 293/120 |
| 4,762,352 | 8/1988 | Enomoto | 293/120 |
| 4,815,777 | 3/1989 | Campbell | 293/107 |

FOREIGN PATENT DOCUMENTS

| | | | |
|---|---|---|---|
| 85759 | 6/1984 | Japan | 293/122 |
| 230847 | 12/1984 | Japan | 293/122 |
| 132450 | 6/1986 | Japan | 293/109 |

Primary Examiner—Andres Kashnikow
Assistant Examiner—Mark T. Le
Attorney, Agent, or Firm—W. G. Muller

[57] ABSTRACT

An automoblile bumper comprising a blow-molded hollow body (5) of synthetic resin located between a surface skin (1) and a reinforcement (2), the hollow body (5) having recesses (7) formed by longitudinally extending ribs (6a) and (6a) on either the front or rear side, or on both sides, whereby the bumper uniformly absorbs impact energy when it is hit and thus reduces shocks transmitted to a car body.

4 Claims, 5 Drawing Sheets

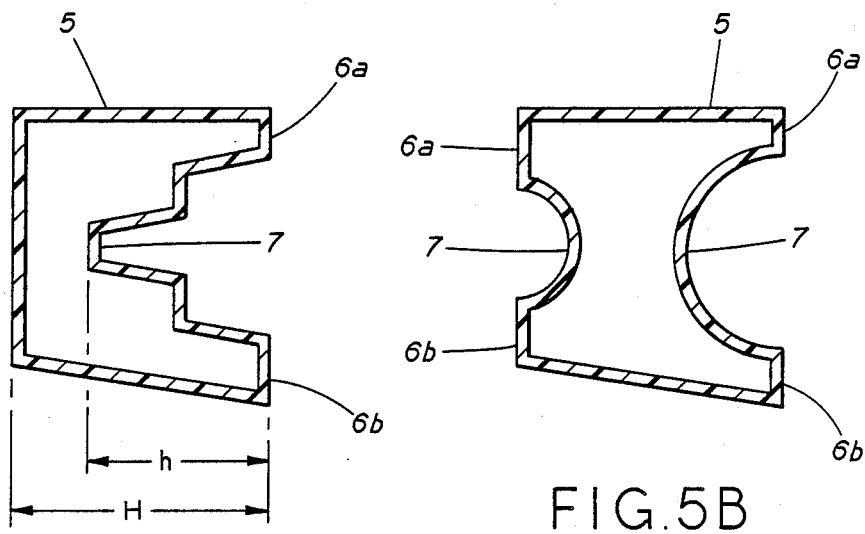
FIG.5A
FIG.5B
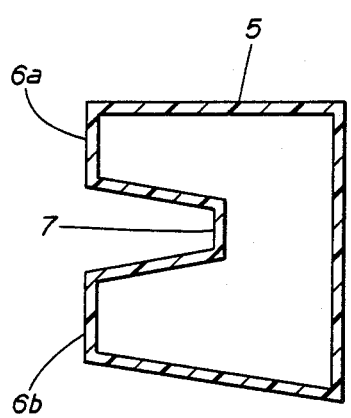
FIG.5C
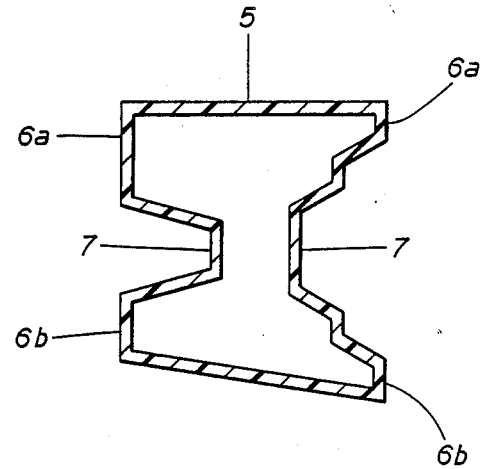
FIG.5D

AUTOMOBILE BUMPER

This is a continuation of application Ser. No. 159,580, filed 3/25/88, now abandoned.

TECHNICAL FIELD

This invention relates to an automobile bumper.

BACKGROUND ART

An automobile bumper usually has an exterior surface skin, a cushioning body for shock absorption, and a reinforcement to reduce deformation. The cushioning body is an important element, and it must have high impact resistance.

The conventional bumper has the cushioning body 21 made of synthetic resin such as expanded urethane, polystyrene, or polypropylene, as shown in FIG. 8. This cushioning body 21 is filled in a space between a surface skin 1 of a synthetic resin (such as polyurethane an polypropylene) and a metal. reinforcement 2 fastened to the skin 1 by bolts 4. As shown, the bumper includes stays 3 adapted for attachment to the car body.

The conventional bumper has a disadvantage in that it does not smoothly absorb frontal shocks, shown by an arrow, and thus the shocks are transmitted to the car body. This results from fine cells of synthetic resin foam becoming compressed upon receiving shocks so that the cushioning effect of the cells diminishes as the cells become more compressed, as shown in FIG. 9.

A possible solution to eliminate this disadvantage and to provide a continuous cushioning effect is to shape the cushioning body 22 as a hollow box having a simple rectangular section, as shown in FIG. 6, so that the hollow box absorbs shocks as it is gradually flattened. However, this hollow box has a limitation in that while the cushioning effect remains as the box is compressed, the rebound power of the cushioning body abruptly drops because the body wall buckles during compression. This leads to uneven energy absorption.

DISCLOSURE OF THE INVENTION

Accordingly, it is an object of this invention to overcome the above-mentioned disadvantages, and to provide an automobile bumper that has uniformly absorbs shocks, that can retain a substantially constant rebound against impact, and that can smoothly reduce the shocks being transmitted to the car body.

The above-mentioned object is achieved by an automobile bumper comprising a blow-molded hollow body of synthetic resin located between a reinforcement and a surface skin, said hollow body having longitudinal recess forming ribs on either the front or rear side, or on both sides.

The automobile bumper of this invention is reinforced by ribs formed on the hollow body located between the reinforcement and the surface skin. The recess forming ribs compartmentalize the cushioning body to uniformly absorb shocks and thus reduce shocks transmitted to the car body.

BRIEF DESCRIPTION OF THE DRAWINGS

FIGS. 5(a) to 5(d) are vertical sectional side views showimg other examples of the cushioning bodies.

PREFERRED EMBODIMENTS TO CARRY OUT THE INVENTION

Figure 1:
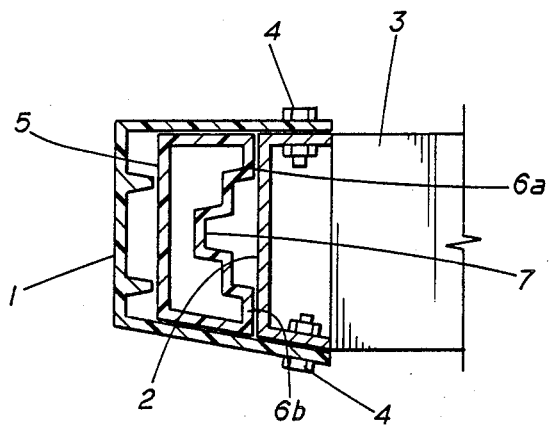
FIG. 1 is a vertical sectional side view showing an example of the automobile bumper of this invention.
Figure 2:
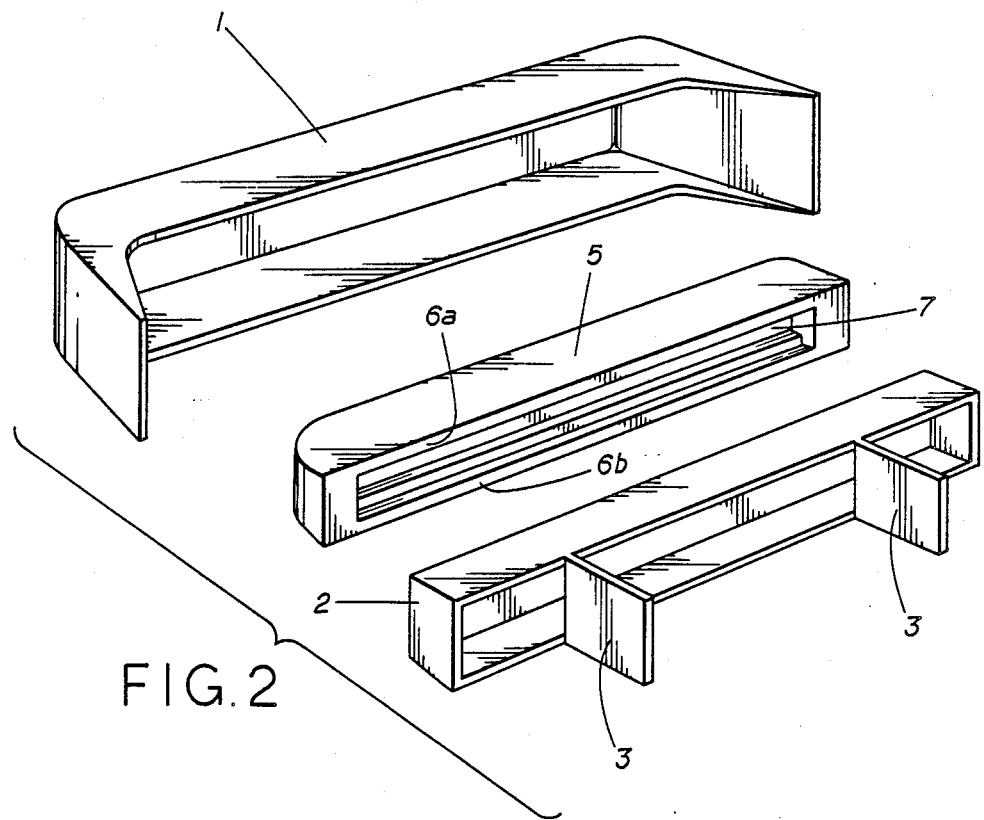
FIG. 2 is a exploded perspective view of the bumper shown in FIG. 1.

This invention is now described in more detail by reference to the following examples:

FIG. 1 is a vertical sectional side view showing an example of the automobile bumper of this invention. FIG. 2 is an exploded perspective view of the bumper shown in FIG. 1 and in which like numbers refer to like parts.

The automobile bumper of this invention has a similar basic construction as conventional bumpers. The invention comprises a cushioning body 5 located between a surface skin 1 of synthetic resin and a metal reinforcement 2 to which the surface skin is bolted, and stays 3 adapted to fix the bumper to the car body. The surface skin 1 is produced from, e.g., polyurethane or polypropylene by, for instance, injection molding, compression molding, or cast molding.

In this invention the cushioning body 5 is formed as a hollow body having longitudinally extending ribs 6a and 6b on either the front or rear side, or on both of them. The ribs 6a and 6b define recesses 7 (FIGS. 1 and 2 show the ribs located on the rear side).

The location and shape of the ribs 6a and 6b may vary depending on the desired shock absorbing properties and overall dimensions of the cushioning body. Two-step ribs may be simply formed on the rear side as shown in FIGS. 1 and 5(a). Ribs may be formed on both the front and rear sides to provide arcuate recesses 7, as shown in FIG. 5(b). Ribs may be formed solely on the front side to produce tapered recess 7, as shown in FIG. 5(c). Ribs may be formed so that a tapered recess 7 is formed on the front side while a two-step recess 7 is formed on the rear side, as shown in FIG. 5(d). A height h of the ribs 6a and 6b should be preferably at 30-90%, more preferably 50-90%, of the overall height H of the cushioning body 5.

The cushioning body 5 should have a wall thickness to match the desired shock resistance. The wall thickness may be reduced to lower the rebound against a given impact force.

The cushioning body 5 of various shapes may be produced by blow molding from a thermoplastic resin capable of blow molding. Blow molding is preferable as it permits integral molding, the wall thickness can be easily varied, and rib sizes and shapes can be easily varied. The thermoplastic resins that can be used for blow molding include polypropylene (PP), high-density polyethylene (HDPE), low-density polyethylene (LDPE), linear low-density polyethylene (LLDPE), polyvinyl chloride (PVC), polycarbonate (PC), nylon, polybutylene terephthalate (PBT), polystyrene (PS), polymethyl methacrylate (PMMA), polyoxymethylene (POM), acrylonitrile-butadiene-styrene resin (ABS), acrylonitrile-styrene copolymer (AS), ethylene-vinyl acetate copolymer (EVA), poly-4-methylpentene-1 (TPX), polyphenylene oxide (PPO), polyphenylene sulfide (PPS), ethylene-propylene rubber (EPR), and ethylene-propylene-diene terpolymer (EPDM). Each type of resin may be used by itself or dissimilar resins may be blended. Typical compositions include a mixture of polypropylene (PP), ethylene-propylene rubber (EPR), and high-density polyethylene (HDPE), and a mixture of polypropylene (PP) and ethylene-propylene rubber (EPR). They may also be used in combination with a reinforcing filler such as glass fiber (GF), talc, mica, and clacium carbonate.

Figure 3:
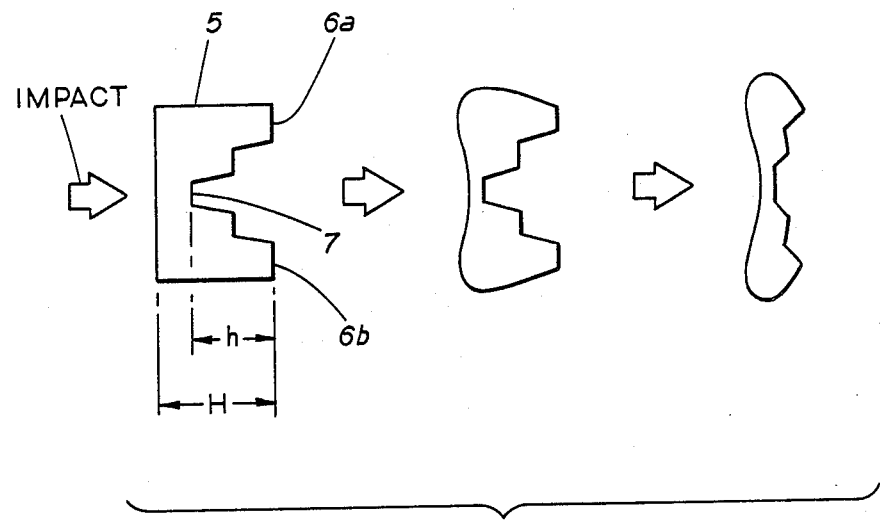
FIG. 3 is a schematic illustration of successive deformation stages of the cushioning body during compression.
Figure 4:
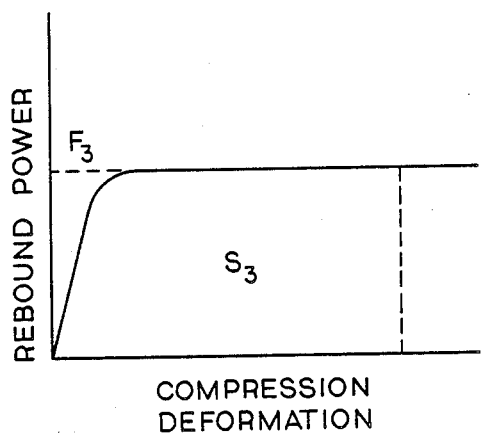
FIG. 4 is a characteristic curve of energy absorption corresponding to the deformation shown in FIG. 3.
Figure 6:
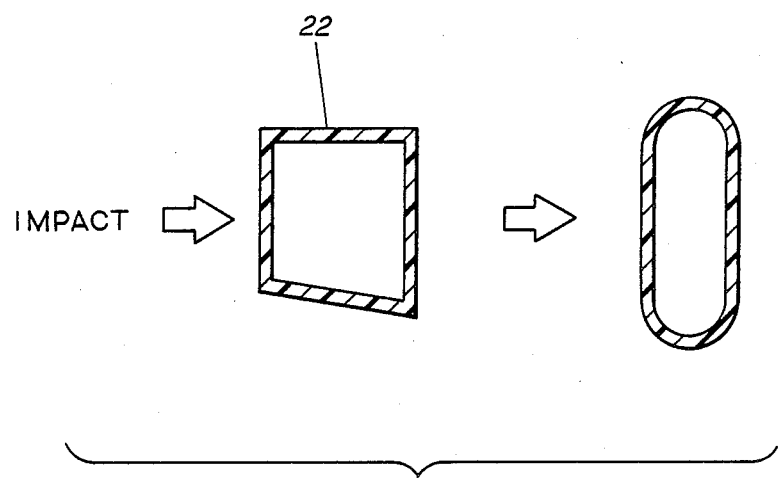
FIG. 6 is a schematic illustration of the condition of a cushioning body of the simple box structure when flattened by compression.
Figure 7:
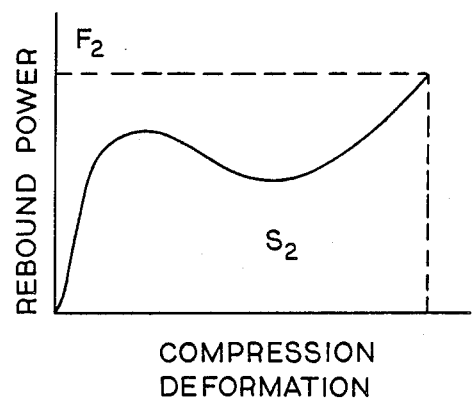
FIG. 7 is a characteristic curve of energy absorption corresponding to the cushioning body shown in FIG. 6.
Figure 8:
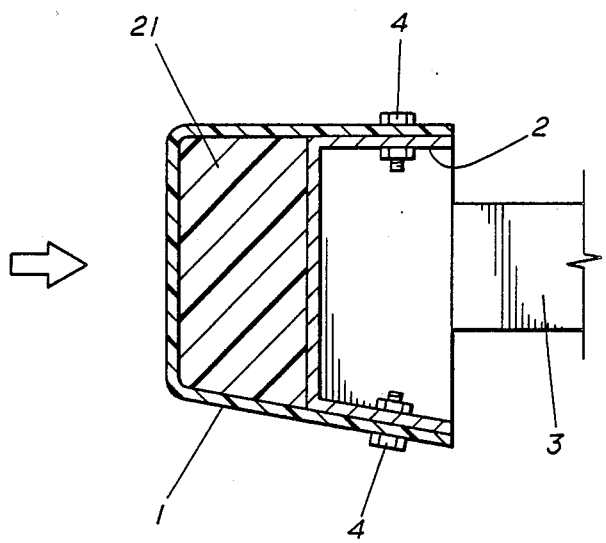
FIG. 8 is a vertical sectional side view of a conventional bumper.
Figure 9:
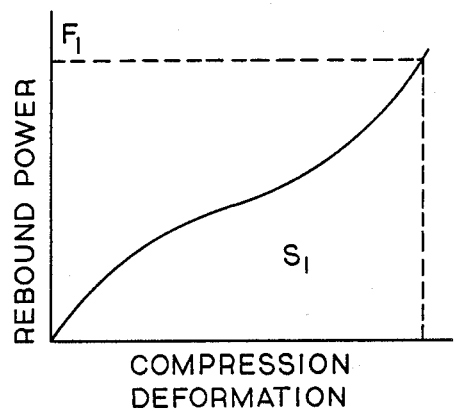
FIG. 9 is a characteristic curve showing successive compression deformations of the cushioning body as shown in FIG. 8.

The bumper of the invention operates to absorb shocks in such a way that the cushioning body 5 becomes gradually compressed upon receiving shocks., for instance, from the front, as shown by an arrow in FIG. 3. The ribs 6a and 6b absorb impact energy $S_3$ uniformly, as shown in FIG. 4, thereby reducing the rebound (impact transmitted to the car body).

The following are the results of an experiment conducted to confirm the effects of the invention:

A bumper cushioning body 1.4 m long, 0.15 m wide, and 0.08 m high, with ribs having a height h corresponding to 80% of the overall height H, is blow-molded from high-density polyethylene (HDPE) by using a large blow molding machine (Model 1PB-200 C built by Ishikawajima-Harima Heavy Industries Co., Ltd.). The blow-molded cushioning body is then disposed between a bumper surface skin (made of a mixture of PP, EPR, and talc) and a metal reinforcement, to produce a sample bumper. The cushioning body is formed with ribs on the rear side, as shown in FIG. 5 (a). The sample bumper is then impact-tested in comparison with a conventional bumper having a surface skin of polyurethane, a cushioning body of polyurethane foam, and a metal reinforcement.

More specifically, the new-type bumper is secured to a car mock-up before a pendulum impact test is run. The pendulum is swung against the center of the bumper at about 8 km an hour, when the impact transmitted to the mock-up is measured. The results are shown in the table below:

| Type of bumper | Conventional bumper | Bumper of the invention |
| --- | --- | --- |
| Construction | Surface skin (polyurethane), cushioning body (polyurethane foam); metal reinforcement. | Surface skin (PP/EPR/talc mixture); cushioning body (HDPE); metal reinforcement |
| Cushioning body | Fine foam cell (polyurethane foam) | Ribbed box (HDPE) |
| Impact speed | 8 km an hour | 8 km an hour |
| Impact on car body | 6 tons | 4 tons |

The table shows that the bumper of the invention absorbs shocks more uniformly than the conventional bumper. It thus transmits to the car body only about 70% of the impact transmitted by the conventional bumper that has a cushioning body of polyurethane foam. This percentage is much lower than the conventional bumper.

INDUSTRIAL USES OF THE INVENTION The automobile bumper of this invention absorbs shocks uniformly and reduces shocks transmitted to a car body since (1) the cushioning body is reinforced by the ribs and (2) the cushioning body is compartmentalized by the recess forming ribs.

Since the cushioning body, which is adapted to absorb shocks, is formed by blow molding, its wall thickness and the rib shape may be easily varied, depending on the particular shock-absorbing requirements.

We claim:

1. An automobile bumper comprising a reinforcement and a surface skin, with a blow-molded hollow body of synthetic resin located between them, said hollow body having at least one longitudinal recess formed by ribs on said hollow body, said ribs having a height of from 50 to 90 percent of the overall height of said hollow body wherein said recess has a depth perpendicular to the longitudinal direction of said recess and said heights are parallel to said depth.

2. An automobile bumper according to claim 1 wherein said ribs are formed on the front of said hollow body.

3. An automobile bumper according to claim 1 wherein said ribs are formed on the rear side of said hollow body.

4. An automobile bumper according to claim 1 wherein said ribs are formed on both sides of said hollow body.

* * * * *